United States Patent [19]

Horie et al.

[11] Patent Number: 4,604,660
[45] Date of Patent: Aug. 5, 1986

[54] METHOD AND CIRCUIT FOR CORRECTING A RECORD TIMING

[75] Inventors: Tuneo Horie, Odawara; Shiyozi Ozaki, Kanagawa; Takikazu Takeuti, Odawara, all of Japan

[73] Assignee: Hitachi, Ltd., Tokyo, Japan

[21] Appl. No.: 542,180

[22] Filed: Oct. 14, 1983

[30] Foreign Application Priority Data

Oct. 27, 1982 [JP] Japan ................................. 57-187417

[51] Int. Cl.⁴ .......................... G11B 5/09; H04B 1/10; H04B 14/04
[52] U.S. Cl. ......................................... 360/45; 375/34
[58] Field of Search ...................... 360/45, 51; 375/34, 375/57

[56] References Cited

U.S. PATENT DOCUMENTS

4,245,263  1/1981  Rathbun et al. ...................... 360/45
4,343,023  8/1982  Nishimura et al. .................. 360/45

Primary Examiner—Vincent P. Canney
Attorney, Agent, or Firm—Antonelli, Terry & Wands

[57] ABSTRACT

Phenomena of shifting of magnetization reversal points called a pattern peak shift and a stream shift which occur when digital data consisting of "0" bits and "1" bits recorded on a record medium at a high density is reproduced are resolved by discriminating whether the digital data to be recorded includes a bit pattern which causes those shifts or not, and for the digital data which may cause such shifts, recording the data at a timing such that the shifts are cancelled when the data is reproduced. Thus, the digital data recorded at the high density through a narrow discrimination window can be precisely reproduced.

13 Claims, 20 Drawing Figures

| if \ ir | 2 | 3 | 4 | --- | 7 |
|---|---|---|---|---|---|
| 2 | L | E | E | E | E |
| 3 | LL | N | N | N | N |
| 4 | LL | L | N | N | N |
| ⋮ | LL | L | N | N | N |
| 7 | LL | L | N | N | N |

N ; NORMAL TIMING

E ; EARLY TIMING

L ; LATE TIMING

LL ; LATEST TIMING

FIG. 9

| if \ ir | 2 | 3 | 4 | --- | 7 |
|---|---|---|---|---|---|
| 2 | L | E | E | E | E |
| 3 | LL | N | N | N | N |
| 4 | LL | N | N | N | N |
| ⋮ | LL | N | N | N | N |
| 7 | LL | N | N | N | N |

| | ORIGINAL DATA BITS | CODE WORD |
|---|---|---|
| a | 1 0 X X | 0 1 0 0 X X X X |
| b | 0 1 0 X | 1 0 0 1 0 0 X X |
| c | 0 0 1 0 | 0 0 1 0 0 1 0 0 |
| d | 1 1 X X | 1 0 0 0 X X X X |
| e | 0 1 1 X | 0 0 1 0 0 0 X X |
| f | 0 0 1 1 | 0 0 0 0 1 0 0 0 |
| g | 0 0 0 X | 0 0 0 1 0 0 X X |

(NOTE) X INDICATES THAT BIT MAY BE EITHER "0" OR "1"

METHOD AND CIRCUIT FOR CORRECTING A RECORD TIMING

BACKGROUND OF THE INVENTION

The present invention relates to a method and circuit for correcting a record timing in recording of digital data on a record medium in a magnetic recording apparatus, such as a magnetic disc storage device, and more particularly to a method and circuit for correcting the record timing to obtain a correct playback timing of data reproduced from a record medium.

In general, a magnetic disc storage device in a computer system stores information on a magnetic disc in the form of digital data consisting of "0"'s and "1"'s. In recent years, in order to store more information on the magnetic disc, it has been required to decrease the minimum distance between adjacent magnetization transitions. However, in order to assure proper bit detection, it is necessary to make the interval between bits more than a certain value.

In order to meet the above requirements, there have been proposed a 3PM (3-position modulation) system in which original data consisting of three bits is converted on a record data consisting of six bits and a conversion system in which a limitation is imparted to the above conversion to shorten the processing time (U.S. Pat. No. 3,689,899; Japanese Laid-Open patent application 7641/73).

However, the prior art methods have a problem in that they cannot exactly reproduce data when the interval between record bits stored on the magnetic disc is reduced to attain a high recording density and when the signal reproduced from the record medium through a predetermined discrimination window, called a data separation window, is converted to a pulse.

SUMMARY OF THE INVENTION

It is an object of the present invention to provide a method and circuit for correcting a record timing so as to be capable of precisely reproducing data from a record medium having a high recording density.

It is another object of the present invention to provide a method and apparatus for correcting a record timing so as to be capable of precisely reproducing data through a predetermined discrimination window from a record medium having a high recording density.

In order to achieve the above objects, according to a first aspect of the present invention, based on a discovery that an error in the reproduced data occurs as a result of combined action of a pattern peak shift and a stream shift to be described later, record data which results in the pattern peak shift and the stream shift is stored at a shifted record timing for record bits so that a shift of the reproduced bits due to the pattern peak shift and the stream shift in the reproduction operation matches the timing of a discrimination window in the reproduction operation.

In accordance with a second aspect of the present invention, there is provided a method for correcting a record timing which comprises a step of detecting the state of a bit at a specified position in a sequence of sequential digital data recorded on a record medium and the states of the i-th bits forward and backward of the bit at the specified position, a step of providing a normal timing in the recording of data if the state of the bit at the specified position is "1" and the number "if" of "0" bits between the "1" bit at the specified position and a "1" bit forward thereof and the number "ir" of "0" bits between the "1" bit at the specified position and a "1" bit backward thereof are equal to "ir+k", providing an early timing in the recording of data if the number "if"="i" and the number "ir">"i" and providing a late timing in the recording of data if the number "if"≧"i" and the number "ir"=i or if the number "if"≧"i+1" and the number "i"="i+1", and a step for correcting the record timing based on the bit pattern determination.

In accordance with a third aspect of the present invention, there is provided a circuit for correcting a record timing which comprises means for detecting the state of a bit at a specified position in the input digital data and the stages of the bits spaced forward and backward from the bit of the specified position, pattern discrimination means for providing a normal timing if the state of the bit at the specified position is "1" and the numbers "if" and "ir" of "0" bits between the "1" bit at the specified position and "1" bits forward and backward thereof, respectively, are equal to "i+k", providing an early timing if the number "if"="i" and the number "ir">i and providing a late timing if the number "if">i and the number "ir"=i or if the number "if">"i+1" and the number "ir"="i+1", and record timing correction means for correcting a record timing based on the bit pattern determination.

DESCRIPTION OF THE PREFERRED EMBODIMENTS

The inventors of the present invention have investigated a cause for the inability to achieve precise reproduction of data when a pattern of the digital data is recorded on a record medium at a high density and the data is reproduced through a data discrimination window, and it was found that the cause is an overlap of the pattern peak shift and the stream shift, which occur when the magnetic data recorded at the high recording density is reproduced.

In order to describe the cause in detail, the pattern peak shift and the stream shift are explained with reference to FIGS. 1 and 2. An actual write pattern is a code word which comprises original data bits with at least two "0" bits being inserted between a "1" bit and the next succeeding "1" bit (called a 2-7 RLLC (run length limited code)). In the following explanation using FIGS. 1 and 2, the two "0" bits inserted between the "1" bits are omitted for the sake of easier understanding. For example, a write pattern "1001" is shown as a write pattern "11".

The pattern peak shift occurs when the record bits "1" which represent magnetization reversals are adjacent to each other (actually the two "0" bits are inserted therebetween to present "1001") and mutually interfere so as to shift relatively in opposite directions.

Figure 1:
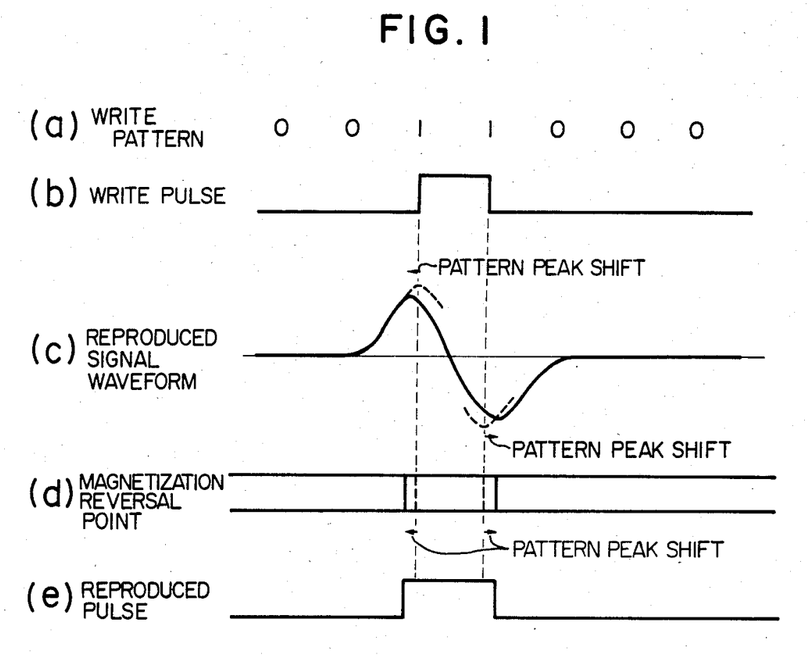
FIGS. 1(a)–(e) illustrate a pattern peak shift which occurs when magnetic information recorded at a high recording density is reproduced.
Figure 2:
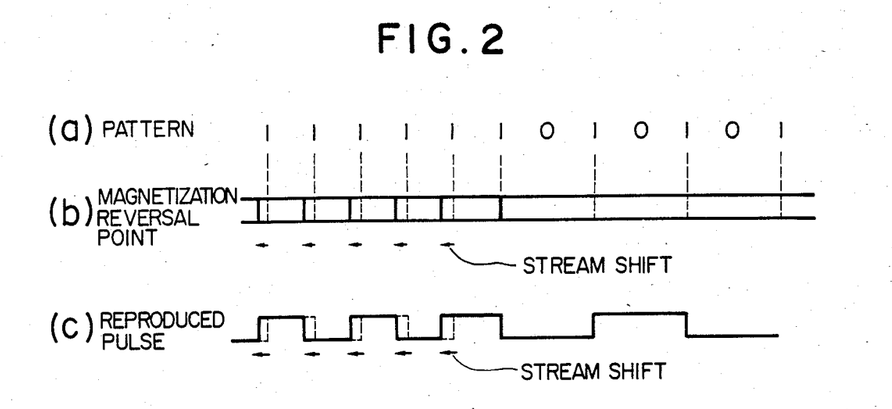
FIGS. 2(a)–(c) illustrate a stream shift which occurs when magnetic information having magnetization reversals recorded sequentially at a high density is reproduced.

Referring to FIG. 1, FIG. 1(a) shows a write pattern comprising digital data "0011000" to be written on the record medium, FIG. 1(b) shows a write pulse for writing the pattern (a) using a magnetic head, FIG. 1(c) shows a signal waveform reproduced by the magnetic head from the magnetic data written on the record medium by the write pulse (b), FIG. 1(d) shows magnetization reversal points of the reproduced signal waveform (c), and FIG. 1(e) shows a pulse reproduced based on the reproduced signal waveform (c). As is apparent from FIG. 1, when the write pattern "0011000" is written, the peaks in the reproduced signal waveform (c) for the pattern "11" representing the contiguous magnetization reversals are shifted outward by the waveform interference and the interval between the magnetization reversals as shown by solid lines in FIG. 1(d) is larger than the theoretical interval (shown by broken lines). Accordingly, when the read pulse is reproduced based on the reproduced signal waveform (c), the width of the reproduced pulse is wider than that of the write pulse as shown in FIG. 1(e). The phenomenon in which the pulse reproduced from the waveform having the contiguous magnetization reversals is shifted is called the pattern peak shift.

The stream shift is now explained with reference to FIG. 2. FIG. 2(a) shows a write pattern comprising digital data "111111010101" to be written on the record medium, FIG. 2(b) shows magnetization reversal points of a waveform reproduced by the magnetic head from the recorded write pattern (a), and FIG. 2(c) shows a reproduced pulse. When the plurality of contiguous magnetization reversals of the write pattern as shown by "111111" are recorded and then reproduced, the magnetization reversal points of the respective bits of the reproduced waveform are shifted forward as shown by solid lines in FIG. 2(b). In the reproduced pulse (c) reproduced from the reproduced signal waveform, the contiguous pulses are shifted backward as shown by solid lines in FIG. 2(c). The cause of the stream shift has not yet been clearly analyzed.

Figure 3:
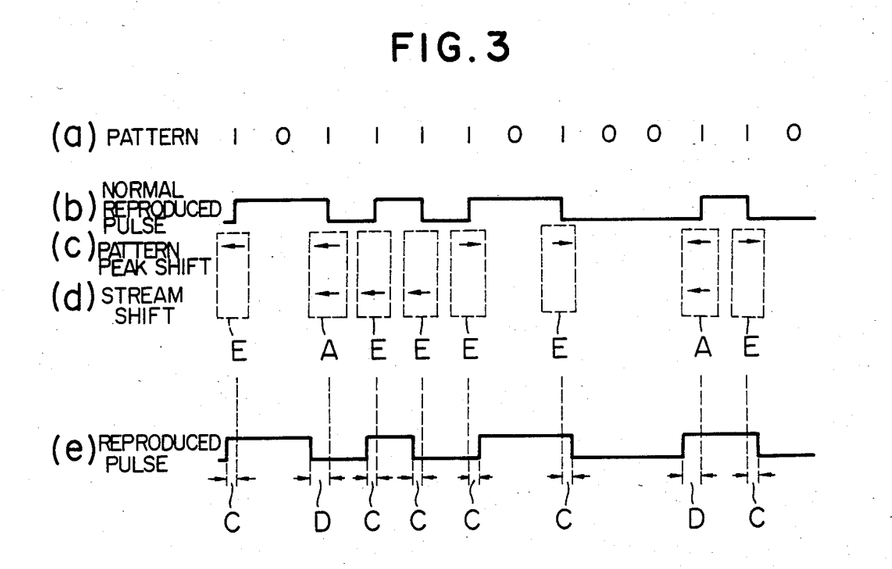
FIGS. 3(a)–(e) illustrate a reproduced data where the pattern peak shift and the stream shift overlap.

The inventors found that the width of the reproduced pulse significantly varies when the pattern peak shift and the stream shift overlap. This is explained with reference to FIG. 3. FIG. 3(a) shows a write pattern comprising digital data "111111010101", FIG. 3(b) shows a normal reproduced pulse which is to be normally reproduced from the recorded write pattern (a), FIGS. 3(c) and 3(d) show a pattern peak shift and a stream shift which occur when the write pattern (a) recorded at a high recording density is reproduced, and FIG. 3(e) shows a pulse reproduced from the shifted reproduced signal.

When the write pattern (a) which comprises the record bits ("1111") having the four contiguous magnetization reversal bits, the record bits ("010") in which the magnetization reversal occurs at an interval of one and the record bits ("0110") having the two contiguous magnetization reversal bits is recorded and then reproduced, it is to be reproduced as shown by the normal reproduced pulse (b). Actually, however, the pattern peak shift (c) and the stream shift (d) occur as shown by arrows. If those shifts are in the same direction as shown by A, the amount of shift is large as shown by D in FIG. 3(e) because of the overlapping of the shifts, when only one of the pattern peak shift and the stream shift occurs as shown by E, the shift C in the reproduced pulse occurs in the direction of the corresponding shift.

Thus, when the record pattern which contains a variety of record bits is recorded with a high recording density, the amounts and the directions of the shifts in the reproduced pulse becomes varient because of the mutual interference of the pattern peak shift and the stream shift phenomenon, and when it is reproduced through a narrow discrimination window (data separation window) to reproduce the high recording density data, the system cannot cover the variety of amounts of shift of the reproduced pulse. If the discrimination window is widened, the record bits of a narrow interval cannot be discriminated.

The inventors noted the characteristics of the pattern peak shift and the stream shift and invented a method by which a "1" bit at a specified position in the record bits is discriminated even if it causes the pattern peak shift and the stream shift, by an arrangement of the magnetization reversals of the record bits, and for the record bit which causes the shift, it is recorded at a position shifted to cancel the shift, and the pulse is reproduced in the reproducing operation at an appropriate timing.

Conceptually, the record timing correction method of the present invention comprises a detection step for detecting a state of a record bit at a specified position in a write pattern containing a plurality of serial record bits to be recorded, a discrimination step for discriminating a pattern configuration of the write pattern, and a record timing correction step for advancing or retarding a record timing of the record bit in accordance with the discrimination result. For the record bit which was discriminated to cause the pattern peak shift and the stream shift, the record timing is corrected in the record timing correction step.

One embodiment of a circuit for implementing the record timing correction method is now explained with reference to FIG. 4.

Figure 10:
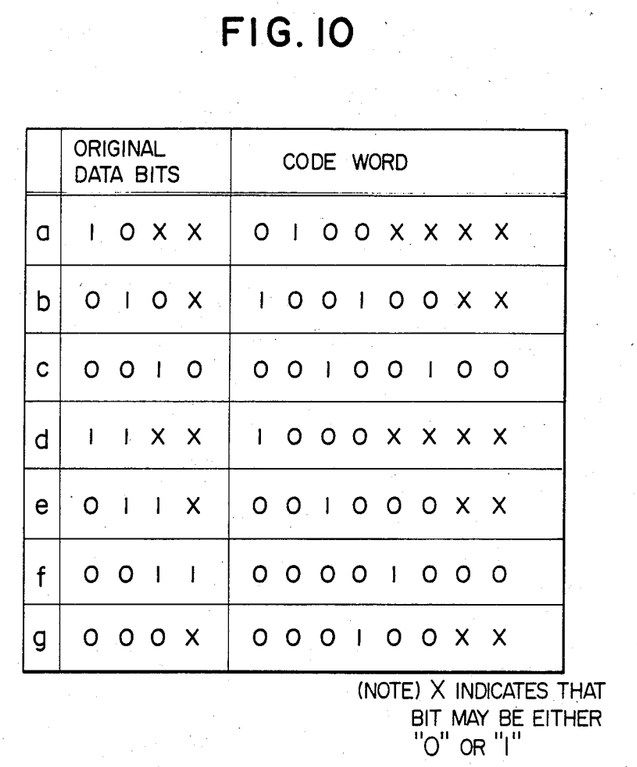
FIG. 10 shows a translation table for a data bit and a code word in accordance with the record timing correction method of the present invention.

A write pattern used in the present embodiment is a code word translated from original data bits such that at least two "0" bits are inserted between a "1" bit and the next succeeding "1" bit. A translation table therefor is shown in FIG. 10. The translation system of the code word is called a 2-7 RLLC (run length limited code) translation system in which the number of "0" bits between the adjacent "1" bits is represented by $i$, $i+1$, $i+2,\ldots,i+k$, and when the number of "0" bits is seven at maximum, $i=2$ and $i+k=7$.

Unlike the description for the pattern peak shift and the stream shift, the present embodiment describes the actual data bits, that is, the data bits having at least two "0" bits inserted between the "1" bits.

Figure 4:
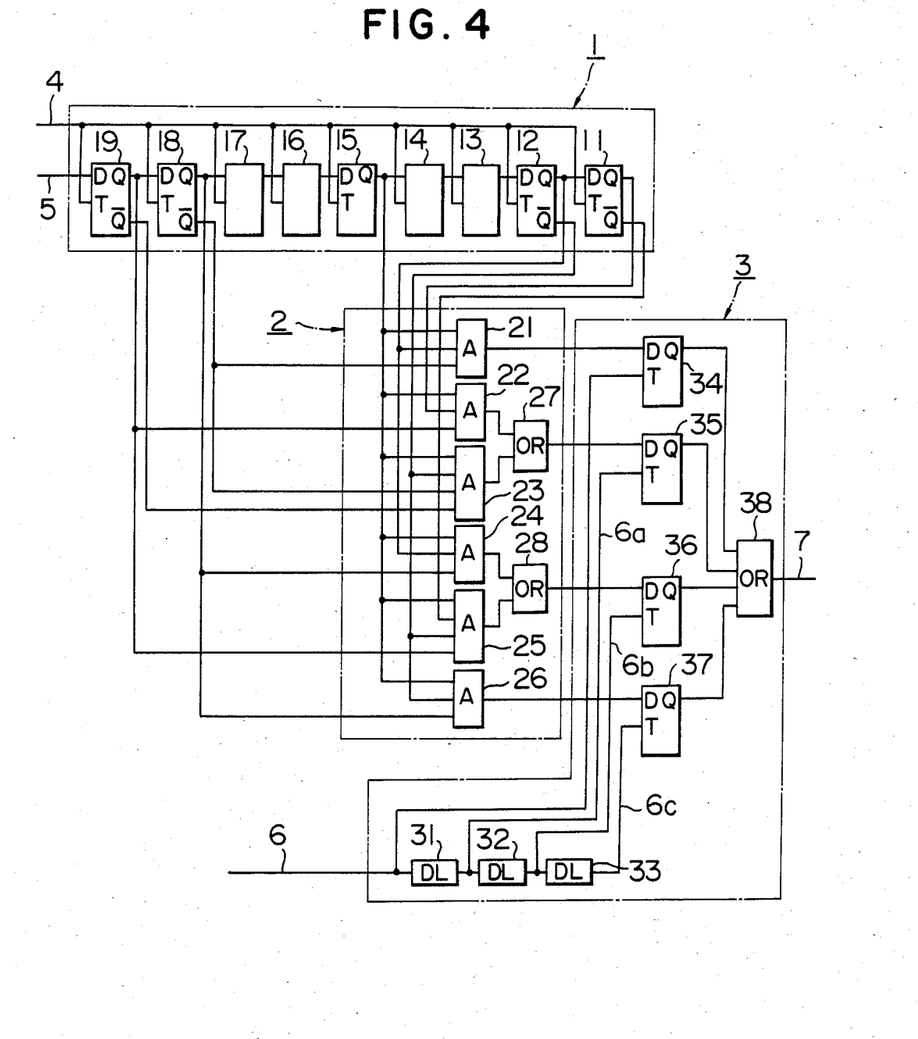
FIG. 4 is an embodiment of a correction circuit for correcting a record timing in accordance with the present invention.

The record timing correction circuit shown in FIG. 4 comprises a shift register 1 which receives a write pattern 5 as the code word and shifts input bits of the write pattern 5 for each input clock 4, a pattern discrimination circuit 2 which detects the state of the center bit of the nine bits of the write pattern loaded in the shift register 1 and the states of the third bits on either side of the center bit, respectively, to discriminate whether the write bit at the specified position (center bit position) has a pattern to cause the pattern peak shift or the stream shift, and a timing correction circuit 3 which controls the record timing of the respective bits based on the discrimination result.

The shift register 1 has nine series-connected flip-flops (FF's) 11-19 and the outputs of the two opposite end FF's 11 and 12, and 18 and 19, respectively, and the center FF 15 are supplied to the pattern discrimination circuit 2. The pattern discrimination circuit 2 comprises AND circuits 21-26 and OR circuits 27 and 28 which receive the outputs of the shift register 1 and produce "1" outputs depending on the bit states of the outputs of the shift register 1 for each record timing. The timing correction circuit 3 comprises delay circuits 31-33 for varying the timing in accordance with the outputs from the pattern discrimination circuit 2, FF's 34-37 and an OR circuit 38.

Figure 5:
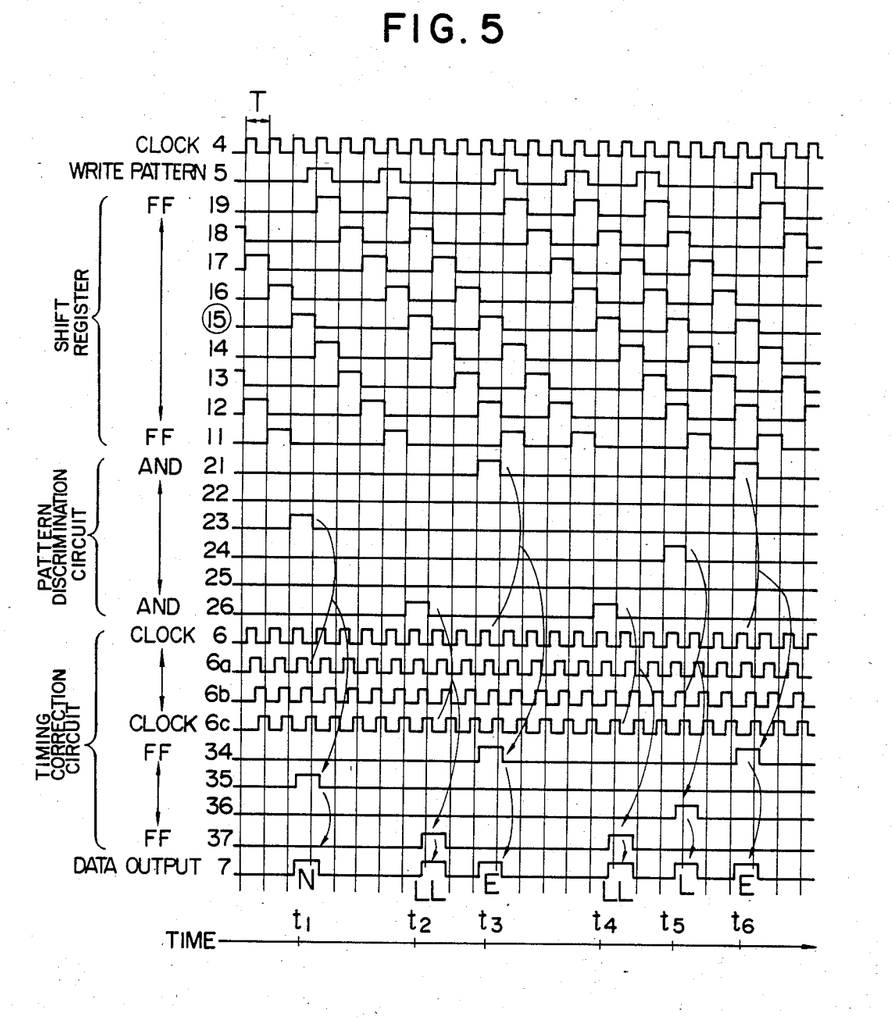
FIG. 5 is a time chart for explaining an operation of the correction circuit of FIG. 4.

FIG. 5 shows a timing chart for explaining the operation of the timing correction circuit and shows the set states of the FF's 11-19 of the shift register 1, the output states of the AND circuits 21-26 and the OR circuits 27 and 28 of the pattern discrimination circuit 2, and the set states of the FF's 34-37 of the timing correction circuit 3.

Referring to FIGS. 4 and 5, the operation of the timing correction circuit 3 of the present embodiment is explained. When the write pattern 5 is sequentially loaded into the shift register 1 by the clock 4 and the FF's 19-11 hold the record bits "000010000" at a time $t_1$, only the FF 15 holds the "1" bit (see FF 15 in FIG. 5) and hence only the AND circuit 23 of the pattern discrimination circuit 2, which receives the Q-output "1" of the FF 15, the $\overline{Q}$-output "1" of the FF 12 and the $\overline{Q}$-output "1" of the FF 18 and the FF 19, meets an AND condition. Thus, the output signal from the AND circuit 23 is supplied to the FF 35 of the timing correction circuit 3 through the OR circuit 27. The FF 35 is timed by a clock $6a$, which is a delayed version of the clock 6 through the delay circuit 31, to produce a data output 7 through the OR circuit 38. The data output timed by the clock $6a$ is used as a normal timing "N" in the present embodiment.

When the FF's 19-11 hold the record bits "010010000" at a time $t_2$, only the FF's 18 and 15 hold the "1" bits and only the AND circuit 26 of the pattern discrimination circuit 2, which receives the Q-output "1" of the FF 15, the $\overline{Q}$-output "1" of the FF 12 and the Q-output "1" of the FF 18, meets an AND condition. The output signal of the AND circuit 26 is supplied to the FF 37 of the timing correction circuit 3. The FF 37 is timed by a clock $6c$, which is the most delayed version of the clock 6 through the three delay circuits 31-33, to produce the data output 7. The clock $6c$ is called "LL" (representing the latest timing clock) in the present embodiment.

The record pattern "000010010" is loaded in the shift register 1 at a time $t_3$, the FF's 15 and 12 of the shift register 1 are set and only the AND circuit 21 of the pattern discrimination circuit 2 meets an AND condition and only the output signal of the AND circuit 21 is supplied to the FF 34 of the timing correction circuit 3. The FF 34 is timed by the non-delayed clock 6 and produces the data output 7 through the OR circuit 38. Since the clock 6 is earlier than the normal clock $6a$, it is called "E" in the present embodiment.

When the content of the shift register 1 is "010010010" at a time $t_5$, the AND circuit 25 of the pattern discrimination circuit 2 receives the Q-output "1" of the FF 15, the $\overline{Q}$-output "1" of the FF 11 and the FF 12 and the Q-output "1" of the FF 18 and meets an AND condition. Thus, it produces an output signal through the OR circuit 28. This output signal is supplied to the FF 36 of the timing correction circuit 3, which is timed by a clock $6b$ delayed by the delay circuits 31 and 32 to produce the data output 7 through the OR circuit 38. The clock $6b$ is called "L" in the present embodiment.

In this manner, the present circuit discriminates the bit configuration of the write pattern loaded in the shift register 1 by the AND condition in the pattern discrimination circuit 2 and selects one of the four output signals depending on the condition, and the timing correction circuit 3 times the output signal of the pattern discrimination circuit 2 by one of the plurality of timing clocks 6-6c so that the record timing is corrected for the pattern peak shift and the stream shift.

In FIG. 4, the delay times of the delay circuits 31-33 for delaying the clocks are 5-30% of the period T of the clocks 4 and 6. In the present embodiment, T=20.8 ns and the delay times of the delay circuits 31-33 are 1.5 ns, 1.5 ns and 4 ns, respectively. Thus, for the clock $6a$ which is the normal timing N, the clock 6 is the 1.5 ns early timing E, and the clocks $6b$ and $6c$ are 1.5 ns and 5.5 ns late timings L and LL, respectively.

Figure 6:
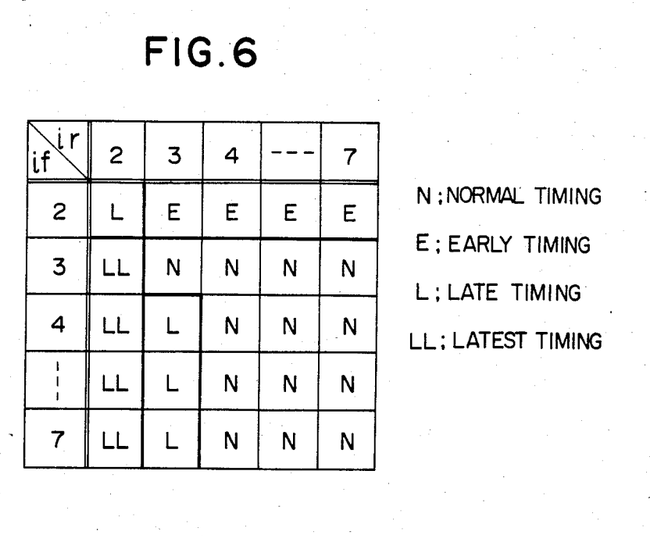
FIG. 6 illustrates a principle of timing correction of the correction circuit of FIG. 4.

The correction conditions for the record timing are shown in a chart of FIG. 6, in which the number of "0" bits between adjacent "1" bits in the code word is 2 to 7 (represented as i=2, i+k=7), the number of "0" bits between a "1" record bit at a specified position and a preceding "1" bit is represented by "if" and the number of "0" bits between the "1" bit at the specified position and a next "1" bit is represented by $$\underbrace{ir}\ \underbrace{if}$$
"ir" ("100 ... 010 ... 01").

As shown in FIG. 6, the correction condition for the record timing is that the early timing E is used when "if"=i=2 and $$\underbrace{ir}\ \underbrace{if}$$
"ir" $\geq$ i + 1 = 3 (XXX000100), the late timing L is used when "if"$\geq$i=2 and $$\underbrace{ir}\ \underbrace{if}$$
"ir" = i = 2 (00100XXXX)

or "if"$\geq$i+2=4 and $$\underbrace{ir}\ \underbrace{if}$$
ir = i + 1 = 3 (00010000X), the latest timing L is used when "if"$\geq$i+1=3 and $$\text{"ir"} = i = 2 \; \overbrace{(001000XXX)}^{\text{ir if}},$$

and the normal timing is used for others.

Another embodiment of the record timing correction circuit of the present invention and an operation thereof are now explained with reference to FIGS. 7–9.

A write pattern used in the present embodiment is a 7-bit pattern having at least two "0" bits inserted between adjacent "1" bits of original data bits (i=2, i+k=7), like the write pattern used in the previous embodiment.

The correction circuit of the present embodiment provides a slightly course correction of the timing to compare with the circuit of FIG. 4.

Figure 7:
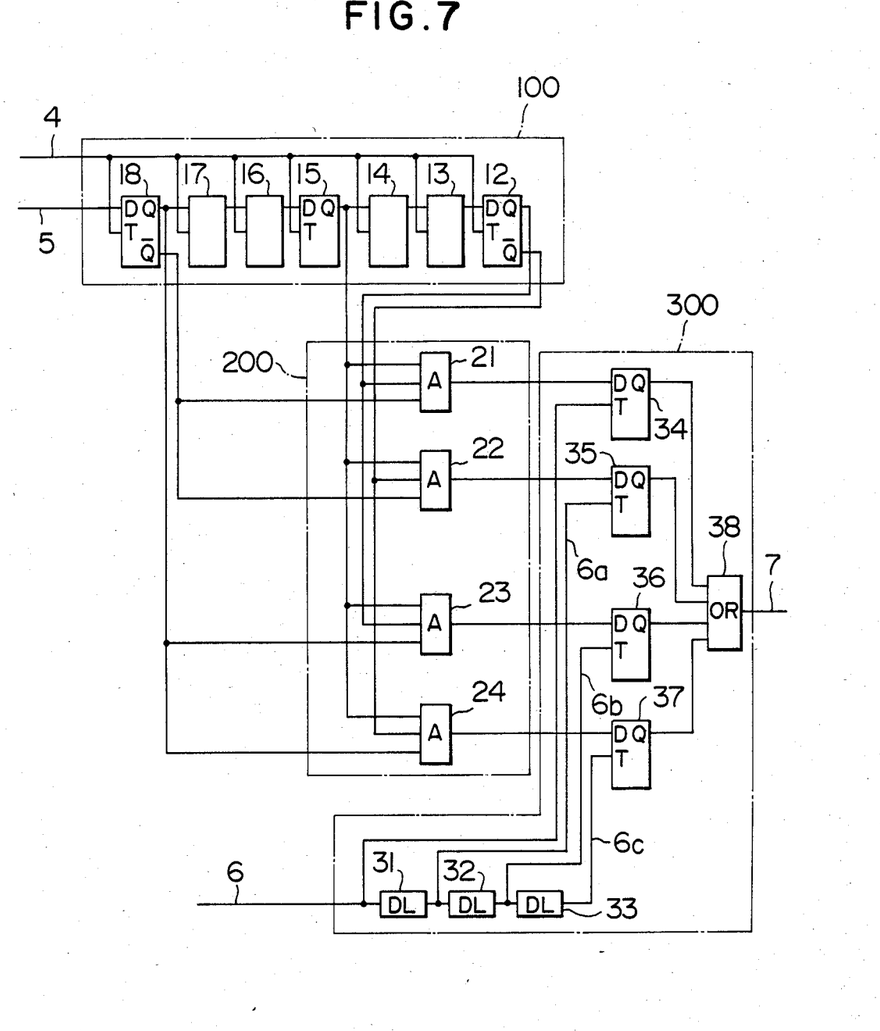
FIG. 7 is another embodiment of the record timing correction circuit of the present invention.

The record timing correction circuit of FIG. 7 comprises a shift register 100, a pattern discrimination circuit 200 and a timing correction circuit 300, like the previous embodiment. It differs from the previous embodiment in that the shift register 100 comprises seven FF's 12–18 and the states of the opposite ends and center FF's 12, 18 and 15 are detected, and the pattern discrimination circuit 200 comprises four AND circuits 21–24. The timing correction circuit 300 comprises FF's 34–37, delay circuits 31–33 and an OR circuit 38, like the previous embodiment.

Figure 8:
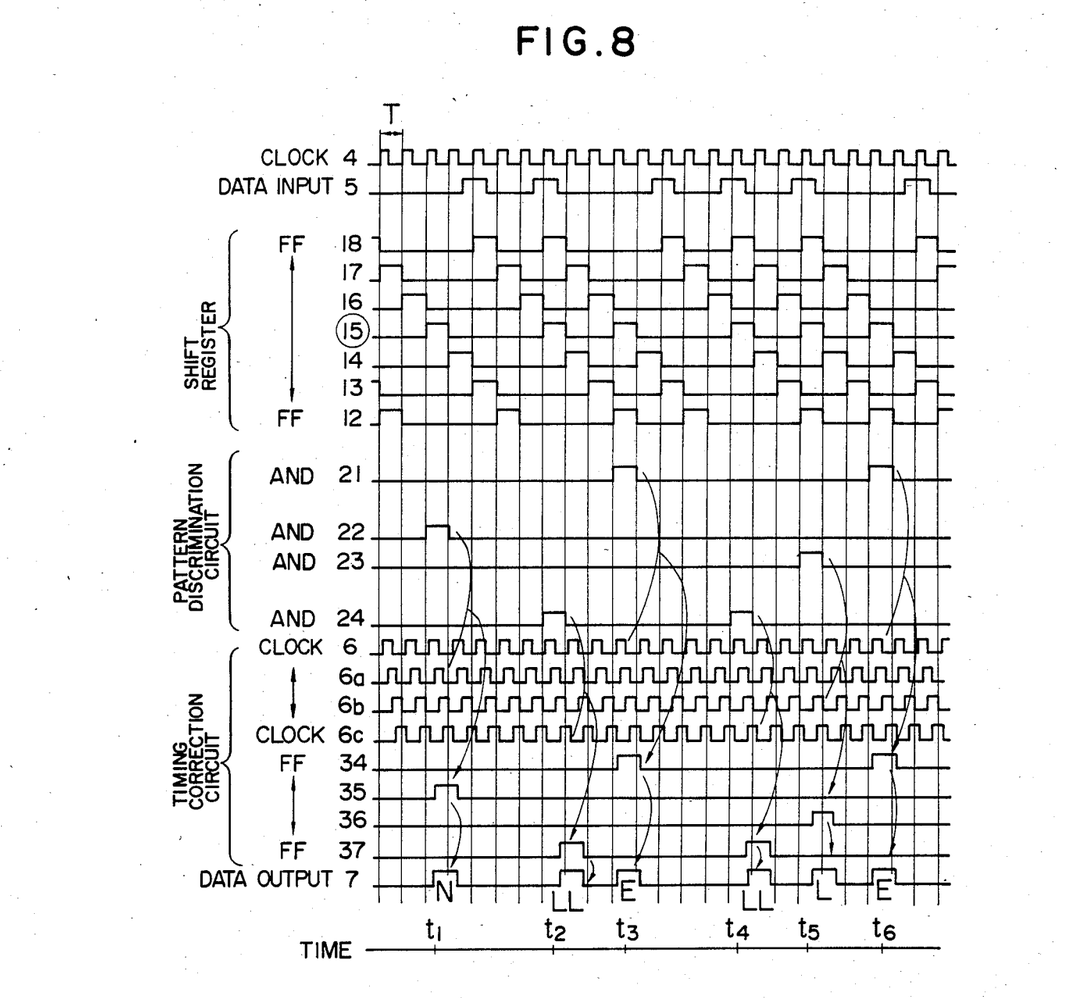
FIG. 8 is a time chart for explaining an operation of the timing correction circuit of FIG. 7.

In the record timing correction circuit of the present embodiment, as shown in FIG. 8, when the bits set in the FF's 18–12 are "0001000" at a time t$_1$, the $\overline{Q}$-output "1" of the FF 18, the Q-output "1" of the FF 15 and the $\overline{Q}$-output "1" of the FF 12 are supplied to the FF 22 of the pattern discrimination circuit 200 so that only the FF 22 meets an AND condition. The output of the AND circuit 22 is supplied to the FF 35 of the timing correction circuit 300, and the FF 35 produces a data output 7 at a timing of a reference clock 6a which is a delayed version of a clock 6 through the delay circuit 31. When the write pattern loaded in the shift register 100 is "1001000" at a time t$_2$, only the AND circuit 24 of the pattern discrimination circuit 200 meets an AND condition and the FF 37 of the timing correction circuit 300 is set. The FF 37 is timed by the latest timing clock 6c so that it produces the output data 7 at the latest timing LL. At a time t$_3$, the write pattern "0001001" is loaded into the shift register 100, the AND circuit 22 of the pattern discrimination circuit 200 meets an AND condition, and the FF 34 of the timing correction circuit 300 is set and it produces the data output 7 at an early timing E. At a time t$_5$, the write pattern is "1001001", and the FF 36 of the timing correction circuit 300 is set through the AND circuit 23 of the pattern discrimination circuit 200 and the data output 7 is produced at a late timing L.

Figure 9:
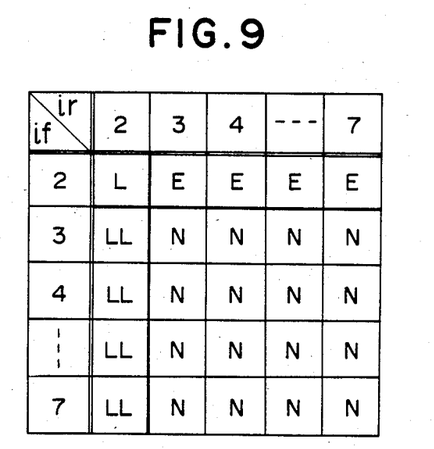
FIG. 9 illustrates a principle of timing correction of the correction circuit of FIG. 7.

The correction condition for the record timing is shown in a chart of FIG. 9. The correction condition is such that the late timing L is used when $$\text{"ir"} = \text{"if"} = i = 2 \; \overbrace{(X001001)}^{\text{ir if}},$$

the latest timing LL is used when "ir"=i=2 and $$\text{"if"} \geq i+1 = 3 \; \overbrace{(001000X)}^{\text{ir if}},$$

the early timing E is used when "ir"≥i+1=3 and $$\text{"if"} = i = 2 \; \overbrace{(X000100)}^{\text{ir if}},$$

and the normal timing N is used for other conditions. The correction conditions for the record timing of the present invention are not limited to those shown in FIGS. 6 and 9. For example, where the discrimination window is not so narrow, the delay time of the delay circuit 31 of FIGS. 4 and 7 may be zero and the timing L instead of the timing LL may be used when "ir'"=i=2 and "if"≥i=2.

The circuits shown in FIGS. 4 and 7 and the timing correction methods shown in FIGS. 6 and 9 may be applied to one magnetic disc storage device so that the circuits and the methods may be selectively used depending on the operation conditions of the device, such as variation of the amount of floating of a magnetic head due to a change of temperature or humidity, and a thermal expansion or aging of a magnetic disc.

The present invention is also applicable to other magnetic storage device such as a magnetic tape storage device.

As described hereinabove, according to the present invention, the bit configuration of the write pattern is discriminated, and for the pattern which may cause the pattern peak shift and the stream shift, the write pattern is recorded at a timing to prevent the shifts. Accordingly, the recorded pattern can be precisely reproduced through the narrow discrimination window and the phase margin is improved.

In the shift registers of the timing correction circuits shown in FIGS. 4 and 7, the $\overline{Q}$-outputs of the FF's of the shift registers are supplied to the pattern discrimination circuit. Alternatively, the Q-outputs of the FF's may be supplied to the pattern discrimination circuit and bit inverters may be inserted before the AND circuits of the pattern discrimination circuit. While the write pattern of the 2–7 RLLC translation system was described with reference to the embodiments, the present invention is not limited thereto, but a 1–8 RLLC translation system (i=1, i+k≧8) in which at least one "0" bit is inserted between adjacent "1" bits and the number of "0" bits inserted is seven at maximum may be used.

We claim:

1. A record timing correction method in a magnetic recording apparatus for writing on a record medium digital data consisting of a plurality of bits translated to include i to i+k "0" bits between adjacent "1" bits, comprising the steps of:

detecting the state of a bit at a specified position in the digital data serially recorded on said record medium and the state of the i-th bit from said specified position;

designating a normal timing in the data recording when the state of the bit at said specified position is "1" and the number "if" of "0" bits between the "1" bit at said specified position and a preceding "1" bit is equal to i+k and the number "ir" of "0" bits between the "1" bit at said specified position and a next "1" bit is equal to i+k, designating an early timing in the data recording when the number "if"=i and the number "ir">i, and designating a late timing in the data recording when the number "if"≧i and the number "ir"=i or when the number "if"≧i+1 and the number "ir"=i+1; and correcting the record timing to provide said normal timing, said early timing or said late timing, whereby the output data is produced at said normal timing, said early timing or said late timing depending on the bit pattern designation.

2. A record timing correction method according to claim 1, wherein the number i of the "0" bits between the adjacent "1" bits in said data is more than one.

3. A record timing correction method according to claim 1, wherein the number i of the "0" bits between the adjacent "1" bits in said data is two and the number i+k is no more than seven.

4. A record timing correction method according to claim 3, wherein said designating step discriminates an intermediate timing later than said normal timing and earlier than said late timing when the number "if"≧3 and the number "ir"=3, and said record timing correction step produces the output data at said intermediate timing when said intermediate timing is designated.

5. A record timing correction method according to claim 2, wherein the number i of the "0" bits between the adjacent "1" bits in the data is one and the number i+k is no more than eight.

6. A record timing correction circuit in a magnetic recording apparatus for writing on a record medium digital data consisting of a plurality of bits translated to include i to i+k "0" bits between adjacent "1" bits, comprising:
bit extraction means for extracting a bit at a specified position in said digital data and the i-th bit from said specified position;
pattern discrimination means connected to receive the extracted bits from said bit extraction means for designating a normal timing for data recording when the state of the bit at said specified position is "1" and the number "if" of "0" bits between the "1" bit at said specified position and a preceding "1" bit is equal to i+k and the number "ir" of "0" bits between the "1" bit at said specified position and a next "1" bit is equal to i+k, designating an early timing for data recording when the number "if"=i and the number "ir">i and designating a late timing for the data recording when the number "if"≧i and the number "ir"=i or when the number "if"≧i+1 and the number "ir"=i+1; and
record timing correction means for writing the digital data at the normal timing, the early timing or the late timing in accordance with the bit pattern designation provided by said pattern discrimination means.

7. A record timing correction circuit according to claim 6, wherein the number i of the "0" bits between the adjacent "1" bits in said data is more than one.

8. A record timing correction circuit according to claim 6, wherein the number if of the "0" bits between the adjacent "1" bits in said data is two and the number i+k is no more than seven.

9. A record timing correction circuit according to claim 8, wherein said pattern discrimination means designates an intermediate timing later than said normal timing and earlier than said late timing when the number "if"≧3 and the number "ir"=3, and said record timing correction means produces the output data at said intermediate timing when said intermediate timing is designated.

10. A record timing correction circuit according to claim 6, wherein the number i of the "0" bits between the adjacent "1" bits in the data is one and the number i+k is no more than eight.

11. A record timing correction circuit according to claim 6, wherein said bit extraction means is a shift register having a plurality of series-connected flip-flops for serially shifting input bits, the bit outputs of a center flip-flop and at least two flip-flops spaced by i forward and behind said center flip-flop being extracted, said pattern discrimination means including a plurality of AND circuits for ANDing the output of said center flip-flop and the outputs of said at least two flip-flops to discriminate said normal timing, said early timing or said late timing, and said record timing correction means including a plurality of delay circuits for sequentially delaying an external clock and a plurality of flip-flops connected to receive the discrimination result from said pattern discrimination means for producing the output data at the timing of the external clock or the delayed clock in accordance with the discrimination result.

12. A record timing correction circuit according to claim 9, wherein said bit extraction means is a shift register having a plurality of series-connected flip-flops for serially shifting input bits, the bit outputs of a center flip-flop and at least two flip-flops spaced by i forward and behind said center flip-flop being extracted, said pattern discrimination means including a plurality of AND circuits for ANDing the output of said center flip-flop and the outputs of said at least two flip-flops to discriminate said normal timing, said early timing or said late timing, and said record timing correction means including a plurality of delay circuits for sequentially delaying an external clock and a plurality of flip-flops connected to receive the discrimination result from said pattern discrimination means for producing the output data at the timing of the external clock or the delayed clock in accordance with the discrimination result.

13. A record timing correction circuit according to claim 10, wherein said bit extraction means is a shift register having a plurality of series-connected flip-flops for serially shifting input bits, the bit outputs of a center flip-flop and at least two flip-flops spaced by i forward and behind said center flip-flop being extracted, said pattern discrimination means including a plurality of AND circuits for ANDing the output of said center flip-flop and the outputs of said at least two flip-flops to discriminate said normal timing, said early timing or said late timing, and said record timing correction means including a plurality of delay circuits for sequentially delaying an external clock and a plurality of flip-flops connected to receive the discrimination result from said pattern discrimination means for producing the output data at the timing of the external clock or the delayed clock in accordance with the discrimination result.

* * * * *